United States Patent [19]

Barnard

[11] Patent Number: 5,575,658
[45] Date of Patent: Nov. 19, 1996

[54] PUZZLE FORMING AN ASSEMBLY OF CHARACTERS AND A METHOD FOR FORMING THE PUZZLE

[75] Inventor: Craig Barnard, Winnetka, Ill.

[73] Assignee: Fundustry, Inc., Winnetka, Ill.

[21] Appl. No.: 337,046

[22] Filed: Nov. 10, 1994

[51] Int. Cl.$^6$ ............................................. G09B 1/40
[52] U.S. Cl. .................... 434/160; 273/157 R; 434/159; 434/406
[58] Field of Search .................... 434/160, 159, 434/171, 170, 156, 406, 193; 273/157 R, 156, 153 R; D21/104

[56] References Cited

U.S. PATENT DOCUMENTS

| | | |
|---|---|---|
| D. 212,242 | 9/1968 | Paulus .................... 273/157 R |
| D. 273,964 | 5/1984 | Roth .................... 273/157 R |
| D. 321,381 | 11/1991 | Slayton. |
| 784,888 | 3/1905 | Reisner .................... 273/157 R |
| 1,230,263 | 6/1917 | Alexander. |
| 2,013,395 | 9/1935 | Wood .................... 273/157 R |
| 3,280,499 | 10/1963 | Studen. |
| 3,853,321 | 12/1974 | Claffie .................... 434/159 X |
| 4,353,700 | 10/1982 | Volakakis. |
| 4,361,328 | 11/1982 | Stein et al.. |
| 5,074,794 | 12/1991 | Von Hagen. |

FOREIGN PATENT DOCUMENTS

| | | | |
|---|---|---|---|
| 0844824 | 6/1970 | Canada .................... 434/159 |
| 010043 | of 1895 | United Kingdom .................... 273/157 R |
| 2184027 | 6/1987 | United Kingdom .................... 273/157 R |

OTHER PUBLICATIONS

"Visual and Tactile Discrimination Puzzles", Educational Design Associates, Inc. (Catalog), 1973, p. 2.

Primary Examiner—Gene Mancene
Assistant Examiner—Jeffrey A. Smith
Attorney, Agent, or Firm—Hill, Steadman & Simpson

[57] ABSTRACT

An assembly is provided having at least two sets of pieces representing characters of a known set. The pieces may be connected to form an assembled puzzle of the pieces wherein the completed assembled puzzle arranges the puzzle pieces in a known order for a known set. Preferably, the pieces are letters of an alphabet wherein one portion of the puzzle pieces are lower case letters of the alphabet and another set of the puzzle pieces are upper case letters, of the alphabet. The lower case letters fit into the upper case letters to complete the upper case letters, and the upper case letters fit into another conventional puzzle piece which, following assembly of the conventional pieces, place the known set of characters in the known order.

18 Claims, 2 Drawing Sheets

PUZZLE FORMING AN ASSEMBLY OF CHARACTERS AND A METHOD FOR FORMING THE PUZZLE

BACKGROUND OF THE INVENTION

The present invention generally relates to an instructional puzzle. More specifically, the present invention relates to a puzzle having a known set of characters, such as letters of an alphabet, for assembly of the puzzle such that the set is arranged in a known order of the set.

It is, of course, generally known to provide puzzles for instructional purposes, such as teaching children and the like, basic fundamentals. One such basic fundamental is teaching children the letters of the alphabet. Children often learn the letters of the alphabet at a young age through memorization and other techniques without any visual or mental conception of the appearance of the letters.

An example of an educational learning aid for teaching children the letters of the alphabet is disclosed in U.S. Pat. No. 4,353,700 to Volakakis. This patent discloses a learning aid having a plastic face cover with openings conforming to the shape of the letters. A metallic backing plate on which indicia may be applied creates better visualization of the opening in the face cover and is coupled beneath the cover plates. A plurality of separate pieces in the form of letters conforming to the array of the openings in the plastic cover is provided to permit insertion by a child.

Another similar learning aid is disclosed in U.S. Pat. No. 5,074,794 to Von Hagen. The sequencing puzzle disclosed in the '794 patent teaches the sequence of a series of elements, such as numbers or letters. The elements, in their characteristic outline shapes, are fitted to overlap and in sequence into correspondingly shaped pockets in a board. A following element, seated before the next preceding element, blocks the preceding element from being seated.

None of the known teaching aids for instructing children, however, provide a means for teaching simultaneously both an upper case and a lower case letter. Frequently, children, after learning the letters of the alphabet, only associate those letters to their upper or their lower case, but typically only to the upper case. Subsequently, children often have difficulty in learning the corresponding lower case letter associated with the upper case letter and further understanding that the lower case letter is the same as the upper case letter or vice versa.

A need, therefore, exists for an improved instructional aid and a method for teaching children and the like the proper sequence of a known set of characters, such as letters, wherein the known set includes a first set of characters and a second set of characters representative of the known set. Further, an instructional aid is provided that sequences the known set in its known order following assembly.

SUMMARY OF THE INVENTION

The present invention provides an assembly, a puzzle and a method for forming a puzzle. The assembly and the puzzle include a number of characters of a known set that may be represented in at least two manners.

To this end, in an embodiment, an assembly is provided representing characters of a known set wherein the characters are representable in an upper case and in a lower case. The assembly has a first plurality of pieces representing the characters of the known set in the upper case and a second plurality of pieces representing the characters of the known set in the lower case wherein each one of the second plurality of pieces of the lower case is insertable into a corresponding one of the first plurality of pieces in the upper case.

In an embodiment, the assembly further has a third plurality of pieces having an aperture outlining the characters represented by the first plurality of pieces wherein each of the first plurality of pieces is insertable into a corresponding one of the apertures of the third plurality of pieces.

In an embodiment, the characters of the known set of the assembly of the present invention represent letters of an alphabet.

In an embodiment, the third plurality of pieces is constructed to connect together such that the characters of the set are arrangeable in a known order.

In an embodiment, the first plurality of pieces and the second plurality of pieces of the assembly of the present invention include at least twenty-six pieces.

In an embodiment, each of the third plurality of pieces has a plurality of apertures.

In an embodiment, the upper case of the first plurality of the pieces of the assembly of the present invention is distinctly colored from a correspondingly colored lower case of the second plurality of pieces.

In an embodiment, the first plurality of pieces and the second plurality of pieces of the assembly of the present invention are constructed from an EVA material.

In an embodiment, the third plurality of pieces of the assembly of the present invention is distinctly colored from the corresponding ones of the first plurality of pieces and the second plurality of pieces.

In another embodiment of the present invention, a puzzle is provided. The puzzle has a first set of pieces representing a known set of characters and a second set of pieces representing the known set of characters wherein the first set is related to the second set and further wherein each one of the second set of pieces is insertable in a corresponding one of the first set of pieces.

In an embodiment, the puzzle has a third set of pieces unrelated to the first set and the second set of pieces wherein the first set of pieces is insertable in an opening in the third set of pieces.

In an embodiment, the puzzle has interengaging mating edges defining a periphery of each of the third set of pieces wherein the third set of pieces is connectable to arrange the first set of pieces and the second set of pieces in a known order for the known set.

In an embodiment, the known set of characters of the puzzle of the present invention is letters of an alphabet.

In an embodiment, the first set of pieces of the puzzle of the present invention represent upper case letters of an alphabet from the known set of characters.

In an embodiment, the second set of pieces of the puzzle of the present invention represent lower case letters of an alphabet from the known set of characters.

In another embodiment of the present invention, a method is provided for forming a puzzle. The method comprises the steps of: providing a first set of pieces representing characters from a known set of characters; providing a second set of characters from the known set of characters wherein the first set is related to the second set; identifying a piece from the second set corresponding to a related piece from the first set; and inserting the piece from the second set into the related piece from the first set.

In an embodiment, the method further comprises the steps of: providing a third set of pieces unrelated to the first set and the second set of pieces; providing an opening in each of the third set of pieces wherein the opening defines one of the first set of pieces; and inserting the piece from the first set into the corresponding opening in one of the pieces of the third set.

In an embodiment, the method further comprises the step of interconnecting the third set of pieces such that the known set of characters is arranged in a known order.

In an embodiment, the known set of characters of the method of the present invention is letters of an alphabet.

It is, therefore, an advantage of the present invention to provide an assembly, a puzzle, and a method for forming a puzzle for use as an instructional aid.

Another advantage of the present invention is to provide an assembly, a puzzle, and a method for forming a puzzle that is used as an instructional aid for learning letters of an alphabet.

Yet another advantage of the present invention is to provide an assembly, a puzzle, and a method for forming a puzzle that may be used as an instructional aid for learning both an upper case and a lower case of letters of an alphabet.

A still further advantage of the present invention is to provide an assembly, a puzzle and a method for forming a puzzle that can be used as an instructional aid for learning an order of a known set of characters.

Moreover, an advantage of the present invention is to provide an assembly, a puzzle and a method for forming a puzzle that is both eye-catching and fun to assemble.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

An assembly is provided having a plurality of parts interconnected to form an assembled puzzle. The pieces of the puzzle include the characters, such as letters of an alphabet, from a known set of characters. The characters, when representative of letters, include both upper cases and lower cases of the letters wherein the lower case letter fits within the upper case letter to complete the letter. Subsequently, the upper case letters are inserted into a plurality of puzzle pieces separately engageable therebetween. The puzzle pieces, when engaged, arrange the characters in the known set in the known order.

Figure 1:
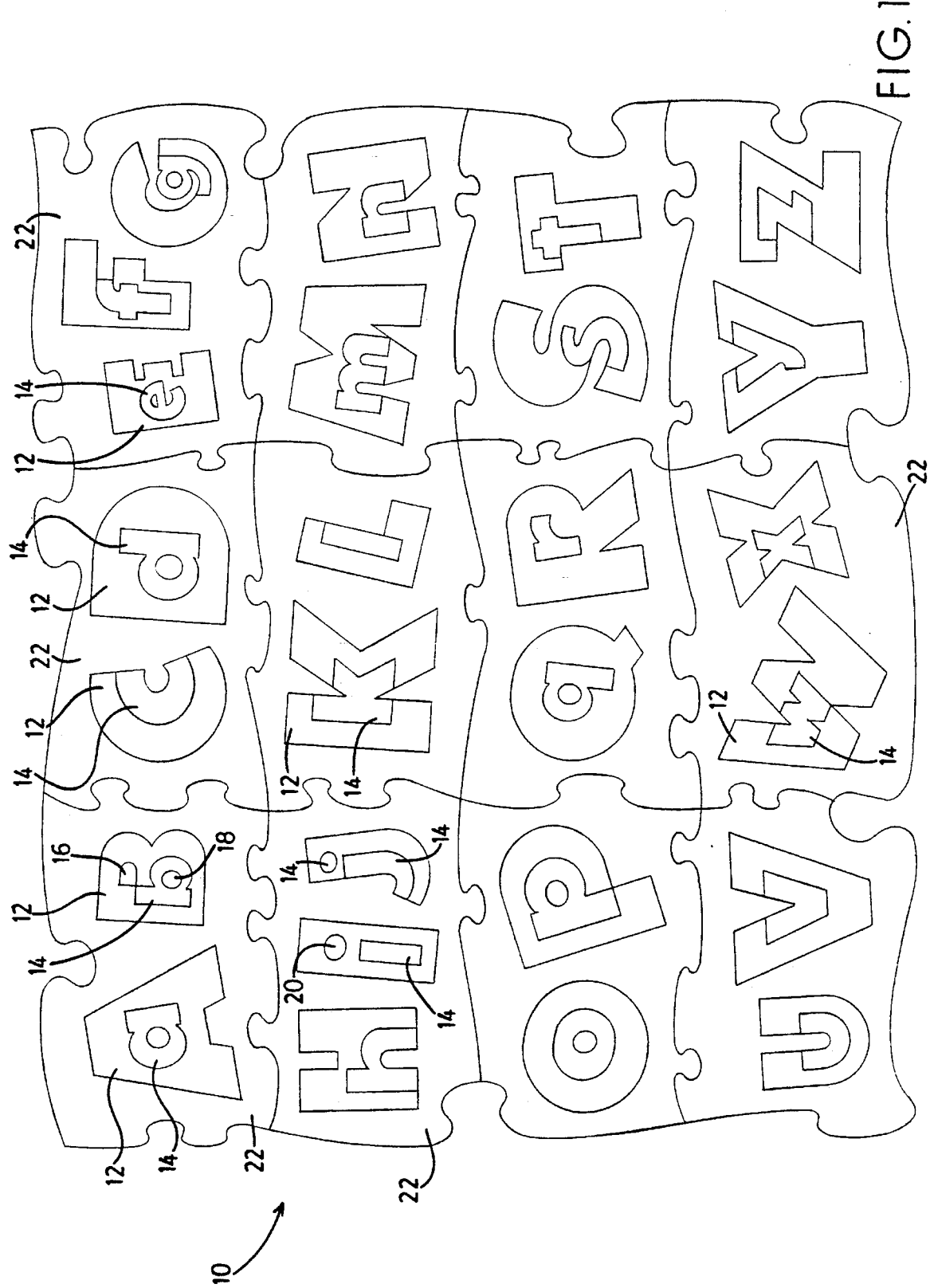
FIG. 1 illustrates a plan view of an embodiment of a puzzle of the present invention.

Referring now to the drawings wherein like numerals refer to like parts, FIG. 1 generally illustrates a puzzle 10. The puzzle 10 includes a plurality of pieces in the form of upper case letters 12. As illustrated in FIG. 1, the upper case letters 12 are the letters of the alphabet as used in the English language, i.e. A, B, C, D . . . X, Y and Z. Another set of pieces is provided as part of the puzzle in the form of lower case letters 14. The lower case letters 14 correspond to the upper case letters 12. That is, the lower case letters 14 are known letters as used in the alphabet as used in the English language, i.e., a, b, c, d . . . x, y and z.

The upper case letters 12 and the lower case letters 14 are uniquely constructed such that the lower case letters 14 fit into the upper case letter 12 within an outer boundary defined by the upper case letter 12. Alternatively, the lower case letters 14 form a portion of the outer boundary of the upper case letters 12.

As illustrated, the lower case letter 14 represented by "a" fits entirely within the outer boundaries of the upper case letter 12 represented by "A". Further, the lower case letter 14 includes a hole therein such that the hole of the lower case letter 14 when placed within the upper case letter 12 matches the at least one point at which that hole would be found in the upper case letter 12.

As another example, the upper case letter 12 represented by "B" includes two apertures 16, 18. The first aperture 16 is provided in the upper case letter 12 itself. The second aperture 18 is provided in the lower case letter 14 representing the letter "b" such that when inserted into the upper case letter 12 represented by "B", the second aperture 18 is in the approximate location of the aperture 18 for the upper case letter 12 as well as the lower case letter 14.

Figure 2:
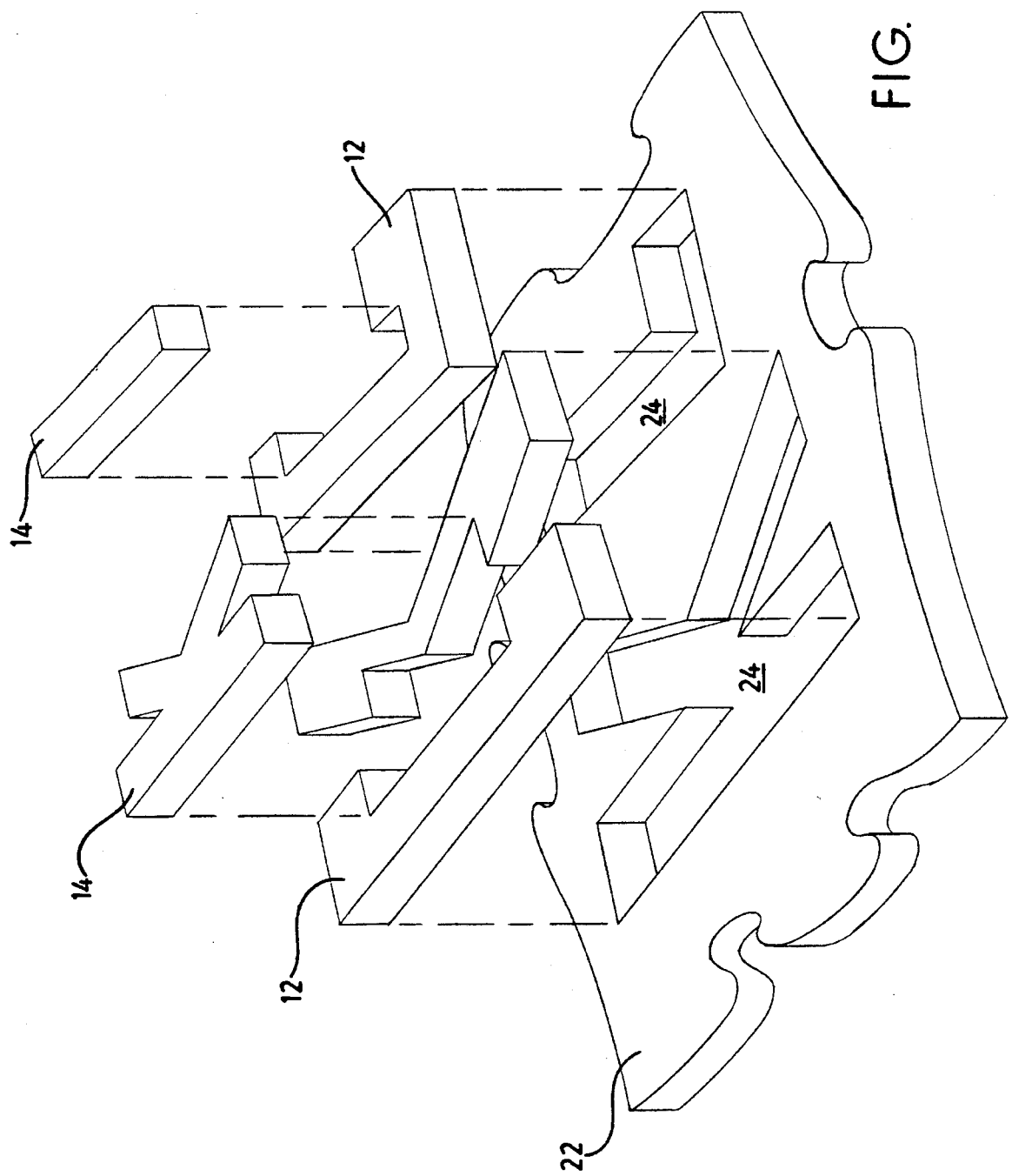
FIG. 2 illustrates an exploded perspective view of an embodiment of a portion of the puzzle illustrated in FIG. 1.

Most of the upper case letters 12 are formed from a single piece, except for the letters "K" and "W" in which the lower case letters 14 representing "k" amd "w" divide the upper case letter 12 represented by "K" and "W" into two separate pieces more clearly shown with reference to FIG. 2.

Likewise, a majority of the lower case letters 14 are formed from a single piece insertable into a corresponding upper case letter 12. The two exceptions are the lower case letters 14 represented by "i" and "j" requiring two separate pieces, one forming the body of the lower case letter 14 and the other piece representing a dot 20 over the lower case letters 14 represented by "i" and "j".

A third set of pieces is provided for the puzzle 10 representing more conventional puzzle pieces 22. The puzzle pieces 22 have a peripheral edge constructed and arranged such that the pieces 22 are interconnectable in the order shown for the puzzle pieces 22 illustrated in FIG. 1. While there is an edge configuration of the puzzle pieces 22 illustrated in FIG. 1, the edge configurations are merely for illustrative purposes only and should not be construed as limiting or a requirement for the invention. The puzzle pieces 22 include openings 24 (See FIG. 2) which outline the upper case letter 14 allowing insertion of the upper case letter 14 into a corresponding one of the openings 24.

In a preferred embodiment, the puzzle pieces 22, including the upper case letters 12 and the lower case letters 14, may be formed from wood, cardboard, or an EVA material. The EVA material provides flotation properties for the pieces allowing the same to be used in an environment where water is present. Of course, other materials for forming the pieces of the puzzle 10 may be implemented by those skilled in the art.

The puzzle pieces 22 as well as the upper case letters 12 and the lower case letters 14 have a substantially identical thickness such that when the puzzle is assembled, a substantially flush surface results in a top plane of the puzzle 10. Further, each of the puzzle pieces 22 may be uniquely colored and the upper case letter 12 within each of the openings 24 of the puzzle pieces 22 may be of contrasting colors to the puzzle pieces 22. Similarly, the lower case letters 14 may be of contrasting color to its corresponding upper case letter 12 and the puzzle piece 22. Of course, the puzzle pieces 22, the upper case letters 12 and the lower case letters 14 may be identically colored.

Referring now to FIG. 2, one of the puzzle pieces 22 from the puzzle 10 of FIG. 1 is shown in an exploded view to illustrate the assembly of one of the puzzle pieces 22 with the upper case letters 12 and the lower case letters 14. As illustrated, and as previously set forth with respect to FIG. 1, the upper case letter 12 represented by "K" is formed from two pieces insertable into the opening 24 of the puzzle piece 22. Following insertion of the upper case letter 12, the lower case letter 14 may be inserted into the remainder of the opening 24 following insertion of the upper case letter 12 into the opening 24.

Likewise, the upper case letter 12 represented by "L" is insertable into the opening 24 of the puzzle piece 22 and then the lower case letter 14 represented by "l" is insertable into the opening 24 in order to complete the puzzle piece. Further, the insertion of the lower case letter 14 into the upper case letter 12 completes the construction and "look" of the upper case letter 12.

Following insertion of the upper case letters 12 and the lower case letters 14 into each of the puzzle pieces 22, the puzzle pieces 22 may be interconnected to form the puzzle 10 as illustrated in FIG. 1. As a result, the upper case letters 12 and the lower case letters 14 are arranged in a known order for a set of letters.

Although the puzzle 10 illustrated in FIG. 1 illustrates either two or three upper case letters 12 and lower case letters 14 within each of the puzzle pieces 22, it should be understood that any number of the upper case letters 12 and lower case letters 14 may be inserted into each of the puzzle pieces 22 as the same is only varying due to the design of the puzzle piece 22. Alternatively, the upper case letters 12 and the lower case letters 14 may be inserted into a board previously cut out with recesses or openings for receiving the upper case letters 12 and the lower case letters 14 in the board without requiring separate assembly of the puzzle pieces 22.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A kit representing characters of a known set, the characters representable in an upper case and in a lower case, the kit comprising:

a first plurality of pieces representing the characters of the known set in the upper case, the first plurality of pieces each having a cut-out section wherein the cut-out section represents a corresponding one of the characters of the known set in the lower case; and a second plurality of pieces representing the characters of the known set in the lower case wherein each one of the second plurality of pieces of the lower case is insertable into the cut-out section of a corresponding one of the first plurality of pieces in the upper case.

2. The kit of claim 1 further comprising:

a third plurality of pieces having an aperture outlining the characters represented by the first plurality of pieces wherein each of the first plurality of pieces is insertable into a corresponding one of the apertures of the third plurality of pieces.

3. The kit of claim 2 wherein the third plurality of pieces are constructed to connect together such that the characters of the known set are arrangeable in a known order.

4. The kit of claim 2 wherein each of the third plurality of pieces has a plurality of apertures.

5. The kit of claim 2 wherein the third plurality of pieces is distinctly colored from the corresponding ones of the first plurality of pieces and the second plurality of pieces.

6. The kit of claim 1 wherein the characters of the known set represent letters of an alphabet.

7. The kit of claim 1 wherein the first plurality of pieces includes at least twenty-six pieces.

8. The kit of claim 1 wherein the second plurality of pieces includes twenty-six pieces.

9. The kit of claim 1 wherein the upper case of the first plurality of pieces is distinctly colored from a corresponding lower case of the second plurality of pieces.

10. The kit of claim 1 wherein the first plurality and the second plurality of pieces are constructed from an EVA material.

11. A puzzle comprising:

a first set of pieces representing a known set of characters wherein each of the pieces has a cut-out section;

a second set of pieces representing the known set of characters wherein the first set is related to the second set and further wherein each one of the second set of pieces is insertable into the cut-out section in a corresponding one of the first set of pieces:

a third set of pieces unrelated to the first set and the second set of pieces wherein the first set of pieces are insertable in an opening in the third set of pieces; and interengaging mating edges defining a periphery of each of the third set of pieces wherein the third set of pieces are connectable to arrange the first set of pieces and the second set of pieces in a known order for the known set.

12. The puzzle of claim 11 wherein the known set of characters is letters of an alphabet.

13. The puzzle of claim 11 wherein the first set of pieces represents upper case letters of an alphabet from the known set of characters.

14. The puzzle of claim 11 wherein the second set of pieces represents lower case letters of an alphabet from the known set of characters.

15. A kit representing characters of a known set, the characters representable in an upper case and in a lower case, the kit comprising:

a first plurality of pieces representing the characters of the known set in the upper case, the first plurality of pieces each having a cut-out section;

a second plurality of pieces representing the characters of the known set in the lower case wherein each one of the second plurality of pieces of the lower case is insertable into the cut-out section of a corresponding one of the first plurality of pieces in the upper case; and a third plurality of pieces having an aperture outlining the characters represented by the first plurality of pieces wherein each of the first plurality of pieces is insertable into a corresponding one of the apertures of the third plurality of pieces.

16. A method for forming a puzzle, the method comprising the steps of:

providing a first set of pieces representing characters from a known set of characters wherein the known set of characters is letters of an alphabet;

providing a second set of pieces representing characters from the known set of characters wherein the first set is upper case letters of the alphabet and the second set is lower case letters of the alphabet;

identifying a lower case letter from the second set corresponding to an upper case letter from the first set; and inserting the lower case letter from the second set into the corresponding upper case letter from the first set.

17. The method of claim 16 further comprising the steps of:

providing a third set of pieces unrelated to the first set and the second set of pieces;

providing an opening in each of the third set of pieces wherein the opening defines one of the first set of pieces; and inserting the piece from the first set into the corresponding opening in one of the pieces of the third set.

18. The method of claim 17 further comprising the step of:

interconnecting the third set of pieces such that the known set of characters is arranged in a known order.

* * * * *